(12) United States Patent
Kohira et al.

(10) Patent No.: US 7,061,722 B2
(45) Date of Patent: *Jun. 13, 2006

(54) MAGNETIC HEAD GIMBAL ASSEMBLY AND MAGNETIC DISK UNIT

(75) Inventors: Hidekazu Kohira, Odawara (JP);
Hiromitsu Tokisue, Ibaraki-ken (JP);
Masaaki Matsumoto, Odawara (JP);
Masayuki Suzuki, Odawara (JP);
Yoshinori Takeuchi, Ishioka (JP);
Toshihiko Shimizu, Ibaraki-ken (JP)

(73) Assignee: Hitachi Global Storage Technologies Japan, Ltd., Odawara (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/245,330

(22) Filed: Sep. 18, 2002

(65) Prior Publication Data

US 2003/0021059 A1    Jan. 30, 2003

Related U.S. Application Data

(60) Continuation of application No. 09/964,738, filed on Sep. 28, 2001, now Pat. No. 6,493,179, which is a continuation of application No. 09/878,350, filed on Jun. 12, 2001, now Pat. No. 6,445,544, which is a continuation of application No. 09/654,915, filed on Sep. 5, 2000, now Pat. No. 6,760,193, which is a division of application No. 08/628,226, filed on Apr. 4, 1996, now Pat. No. 6,157,519.

(30) Foreign Application Priority Data

Apr. 7, 1995    (JP)    ................................ 07-082287

(51) Int. Cl.
*G11B 5/48* (2006.01)

(52) U.S. Cl. ................................. 360/245.1; 360/237

(58) Field of Classification Search ............. 360/236.3, 360/97.01, 245, 245.1, 246.1, 246.2, 245.3, 360/245.6, 246.3, 246.4, 237
See application file for complete search history.

(56) References Cited

U.S. PATENT DOCUMENTS 4,802,042 A    1/1989    Strom    .................... 360/236.3

(Continued)

FOREIGN PATENT DOCUMENTS

EP    642130    3/1985

(Continued)

OTHER PUBLICATIONS

Patent Abstracts of Japan, vol. 17, No. 412 (p. 1583), Jul. 30, 1993 & JP-A-05-074090 (Hitachi), Mar. 26, 1993.

(Continued)

*Primary Examiner*—Brian E. Miller
(74) *Attorney, Agent, or Firm*—Kenyon & Kenyon LLP

(57) ABSTRACT

A magnetic disk unit includes a magnetic disk attached to a spindle so as to be rotatable, a slider having a magnetic head for reading/writing data onto/from the magnetic disk, a suspension for providing the slider with a predetermined load, and an actuator arm for positioning the slider attached to the suspension on the magnetic disk. A first pad including the magnetic head and second pads including no magnetic heads are disposed on an air bearing surface of the slider. During rotation of said magnetic disk, a part of the first pad keeps in contact with the magnetic disk. A load point of the suspension with respect to the slider is positioned between a leading edge of the slider and a position located at a distance equivalent to substantially 0.42 times a whole length of the slider from the leading edge of the slider.

1 Claim, 9 Drawing Sheets

U.S. PATENT DOCUMENTS

| | | |
|---|---|---|
| 5,041,932 A | 8/1991 | Hamilton .................... 360/104 |
| 5,079,659 A | 1/1992 | Hagen |
| 5,079,660 A | 1/1992 | Yumura et al. |
| 5,267,104 A | 11/1993 | Albrecht .................. 360/97.02 |
| 5,267,109 A | 11/1993 | Chapin et al. .............. 360/103 |
| 5,285,337 A | 2/1994 | Best et al. ............... 360/97.02 |
| 5,309,303 A | 5/1994 | Hsia et al. |
| 5,336,550 A | 8/1994 | Ganapathi et al. |
| 5,383,073 A | 1/1995 | Masukawa et al. ...... 360/245.3 |
| 5,404,256 A | 4/1995 | White ..................... 360/236.3 |
| 5,418,667 A | 5/1995 | Best et al. |
| 5,424,888 A | 6/1995 | Hendriks et al. |
| 5,430,591 A | 7/1995 | Takeuchi et al. |
| 5,438,467 A | 8/1995 | Dorius et al. ............ 360/236.3 |
| 5,455,730 A | 10/1995 | Dovek et al. |
| 5,473,485 A | 12/1995 | Leung et al. ............... 360/103 |
| 5,478,622 A | 12/1995 | Nakamura et al. |
| 5,490,026 A | 2/1996 | Dorius et al. ............ 360/236.3 |
| 5,499,149 A | 3/1996 | Dovek |
| 5,526,204 A | 6/1996 | French et al. |
| 5,568,981 A | 10/1996 | Nepela et al. ................ 384/12 |
| 5,612,839 A | 3/1997 | Jacques |
| 5,673,156 A | 9/1997 | Chen et al. |
| 5,673,161 A | 9/1997 | Yanagisawa et al. |
| 5,798,889 A | 8/1998 | Dorius et al. |
| 5,917,679 A | 6/1999 | Park et al. |
| 6,157,519 A | 12/2000 | Kohira et al. |
| 6,181,517 B1 | 1/2001 | Yanagisawa et al. |
| 6,493,179 B1 * | 12/2002 | Kohira et al. ............ 360/97.01 |

FOREIGN PATENT DOCUMENTS

| | | |
|---|---|---|
| EP | 0 387 444 | 9/1990 |
| EP | 518566 | 12/1992 |
| JP | 62-167610 | 7/1987 |
| JP | 05-074090 | 3/1993 |
| JP | 5-074090 | 3/1993 |
| JP | 06-012808 | 1/1994 |
| JP | 6-052645 | 2/1994 |
| JP | 6-0251528 | 9/1994 |
| JP | 06-349221 | 12/1994 |
| JP | 06349221 A * | 12/1994 |

OTHER PUBLICATIONS

Patent Abstracts of Japan, vol. 95, No. 4, May 31, 1995 & JP-A-07-006539 (Hitachi), Jan. 10, 1995.

* cited by examiner

MAGNETIC HEAD GIMBAL ASSEMBLY AND MAGNETIC DISK UNIT

This is a continuation of application Ser. No. 09/964,738 filed Sep. 28, 2001 now U.S. Pat. No. 6,493,179, which is a continuation of application Ser. No. 09/878,350 filed Jun. 12, 2001, U.S. Pat. No. 6,445,544, which is a continuation of application Ser. No. 09/654,915 filed Sep. 5, 2000 now U.S. Pat. No. 6,760,193, which is a division of application Ser. No. 08/628,226, filed Apr. 14, 1996 U.S. Pat. No. 6,157,519.

BACKGROUND OF THE INVENTION

The present invention relates to magnetic disk units, and in particular to a magnetic head slider and its suspension structure in a magnetic disk unit of the contact recording type in which a magnetic head slider is brought into contact with a magnetic disk.

In order to increase the recoding density of magnetic disk units, the flying height between a slider for mounting a magnetic head and a magnetic disk has tended to be reduced. As the flying height is reduced, contact between the slider and the magnetic disk is becoming inevitable. Thus, there has been proposed a magnetic disk unit of the so-called contact recording type in which magnetic recording is performed with the slider brought into contact with the magnetic disk from the beginning.

In U.S. Pat. No. 5,041,932, there is disclosed an integral magnetic head/suspension structure formed as a long and slender bent dielectric object or as a suspension having a magnetic head on one end thereof. This integral magnetic head/suspension has a feature of extremely light mass. By reducing the mass of the integral magnetic head/suspension, the load applied to the magnetic disk can be reduced and wear between the magnetic head/slider and the magnetic disk can be reduced.

In a structure proposed in JP-A-6-251528, the flying force generated by the air flow caused by rotating the magnetic disk under the integral magnetic head/suspension assembly is canceled by mounting the suspension section so as to form a suitable angle with respect to the surface of the magnetic disk and thereby causing a compressive force due to air flow to act. In this structure, the contact state is maintained over the entire surface of the magnetic disk.

In a positive pressure slider of flying/contact mixture type proposed in JP-A-5-74090 and JP-A6-052645, a magnetic head is disposed on a center rail formed on a trailing edge of a positive pressure slider of a flying type, and only the center rail having the magnetic head is brought into contact with a magnetic disk to conduct magnetic recording.

In a negative pressure slider of the flying/contact mixture type proposed in JP-A-62-167610, a trailing edge of a negative pressure slider of a flying type is brought into contact with a magnetic disk to conduct magnetic recording.

SUMMARY OF THE INVENTION

An object of the present invention is to reduce, in magnetic disk units of the contact recording type, contact force between a slider and a magnetic disk so as not to damage the slider and the magnetic disk fatally.

Another object of the present invention is to provide a magnetic disk unit capable of maintaining uniform contact force over the entire surface of a magnetic disk and conducting stable contact recording over a long period.

Another object of the present invention is to decrease frictional force caused in a contact portion between a slider and a magnetic disk when the slider is positioned on a data track on the magnetic disk by an actuator arm to such a degree as not to affect the positioning accuracy.

Still another object of the present invention is to restrict jumping of a slider from a magnetic disk caused by unsteady contact force, debris on the magnetic disk, or vibration of the magnetic disk unit.

In accordance with a first aspect of an embodiment of the present invention, a first pad including a magnetic head and second pads which do not include a magnetic head are provided on an air bearing surface of a slider of a magnetic disk. A part of the first pad keeps in contact with a magnetic disk when the magnetic disk is rotated, and a load point is positioned between a leading edge of the slider and a position located at a distance of approximately 0.42 times the whole length of the slider from the leading edge of the slider.

In accordance with a second aspect of an embodiment of the present invention, a trailing pad including a magnetic head and other pads which do not include a magnetic head are provided on an air bearing surface of a slider of a magnetic disk unit, and only the trailing pad keeps in contact with the magnetic disk while the magnetic disk is being rotated whereas other pads are kept apart from and fly over the magnetic disk due to an air flow caused by the rotation of the magnetic disk, the contact force between the trailing end pad and the magnetic disk being at most 200 mgf.

In accordance with a third aspect of an embodiment of the present invention, a slider having a magnetic head includes, in its air bearing surface, a first pair of positive pressure side pads located on the leading side, a second pair of positive pressure side pads located nearly in the center in the slider length direction, and a positive pressure center pad. Located on the trailing edge side and containing the magnetic head, the area of the second positive pressure side pads being greater than the area of the first positive pressure side pads and the area of the positive pressure center pad.

In accordance with a fourth aspect of an embodiment of the present invention, a first pad including the magnetic head and second pads including no magnetic heads are disposed on the air bearing surface of the slider, and flying force generated by the first pad is sufficiently smaller than flying force generated by the second pads. The magnitude and pressure center of the flying force generated by the second pads is substantially coincident with the magnitude of the load driven to the slider by the suspension and the load point, and the slider is provided by a gimbal of the suspension with a moment force in such a direction as to make the first pad approach the magnetic disk, only the first pad keeping in contact with the magnetic disk during rotation of the magnetic disk.

DETAILED DESCRIPTION

Hereafter, an embodiment of the present invention will be described in detail by referring to drawing.

Figure 1:
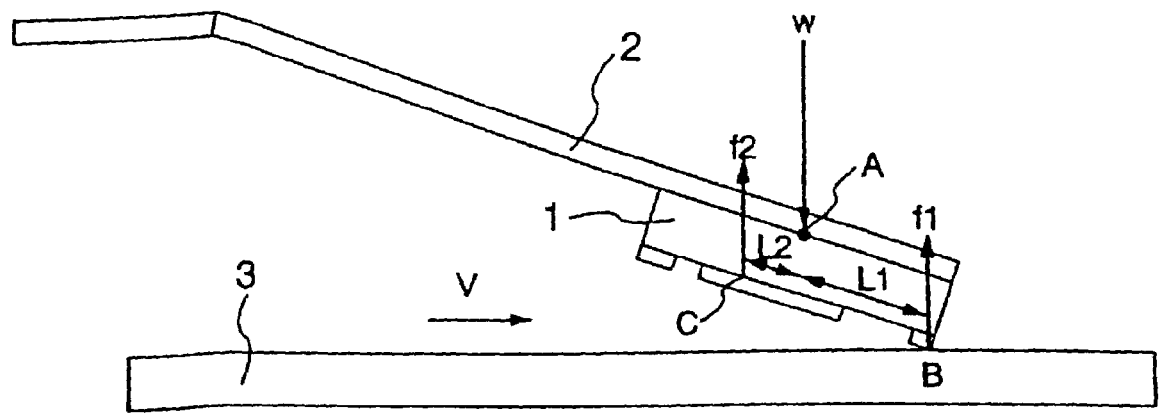
FIG. 1 is a side view showing the contact state between a slider and a magnetic disk in an embodiment~of the present invention.
Figure 2:
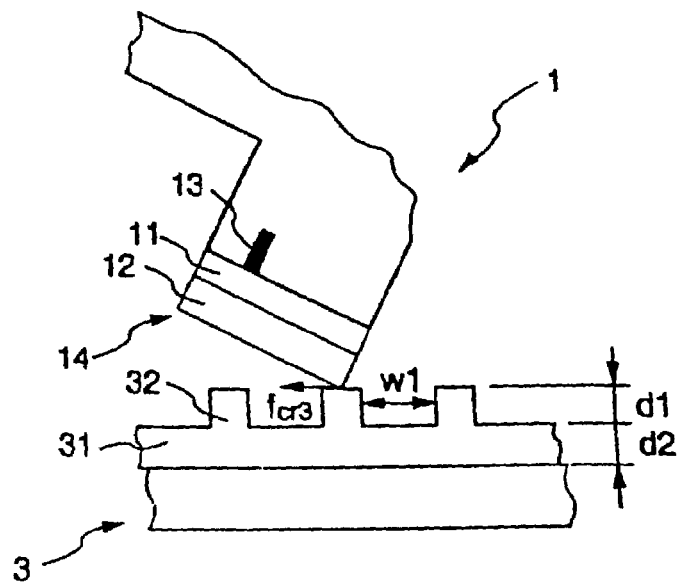
FIG. 2 is an enlarged view of the slider and the magnetic disk shown in FIG. 1.

FIG. 1 is a side view illustrating the contact state between a slider and a magnetic disk in a magnetic disk unit of the mixed flying/contact type which is a first embodiment of the present invention. A predetermined load w is applied to a slider 1 by a suspension 2 via a load point A. A magnetic disk 3 is driven and rotated by a spindle (not illustrated). As the magnetic disk 3 is rotated, an air flow is generated in a direction represented by an arrow V and it flows into a space formed between the slider 1 and the magnetic disk 3. This air which has flowed into the space between the slider 1 and the magnetic disk 3 is compressed between them, and the leading side of the slider 1 flies with flying force f2. The trailing edge of the slider 1 comes in contact with the magnetic disk 3 while generating contact force f1. Furthermore, frictional force $f_{cr3}$ is generated in a contact portion B in a direction opposite to the air inflow direction as shown in FIG. 2. Denoting the distance measured from the load point A to the contact portion B located between the slider 1 and the magnetic disk 3 by L1 and denoting the distance measured from the load point A to a pressure center C of the flying force f2 by L2, the slider 1 carries out contact recording with respect to the magnetic disk 3 in such a posture as to satisfy the following two equations.

$$w = f1 + f2 \quad (1)$$

$$f1 \cdot L1 = f2 \cdot L2 \quad (2)$$

From these two equations, the contact force f1 is related to the thrust load w by the following equation.

$$f1 = \frac{L2 \cdot w}{L1 + L2} \quad (3)$$

From equation (3), it will be appreciated that the substantial contact force f1 can be made smaller than the load w in the slider/suspension of mixed flying/contact type by suitably selecting the relation between the distance L1 between the load point A and the contact portion B and the distance L2 between the load action point A and the pressure center C of flying force. On the other hand, in an integral magnetic head/suspension having light mass and a light load, the load point and the contact portion are located nearly on a straight line. Since L1 is thus nearly 0 in this case, the load w becomes nearly equal to the contact force f1. Although the contact force f1 can be made less than the load w as expressed by equation (3) in the slider/suspension of mixed flying/contact type, the flying force between the slider 1 and the magnetic disk 3 increases as the velocity of the magnetic disk 3 is increased, making it difficult to maintain the stable contact state. Furthermore, according to the study of the present inventors, the slider/suspension and the magnetic disk must satisfy various conditions for the magnetic head to maintain the stable contact state over a long time without causing a fatal fault on the slider 1 and the magnetic disk 3. These facts will now be described in detail by referring to FIGS. 2 through 4.

Figure 3:
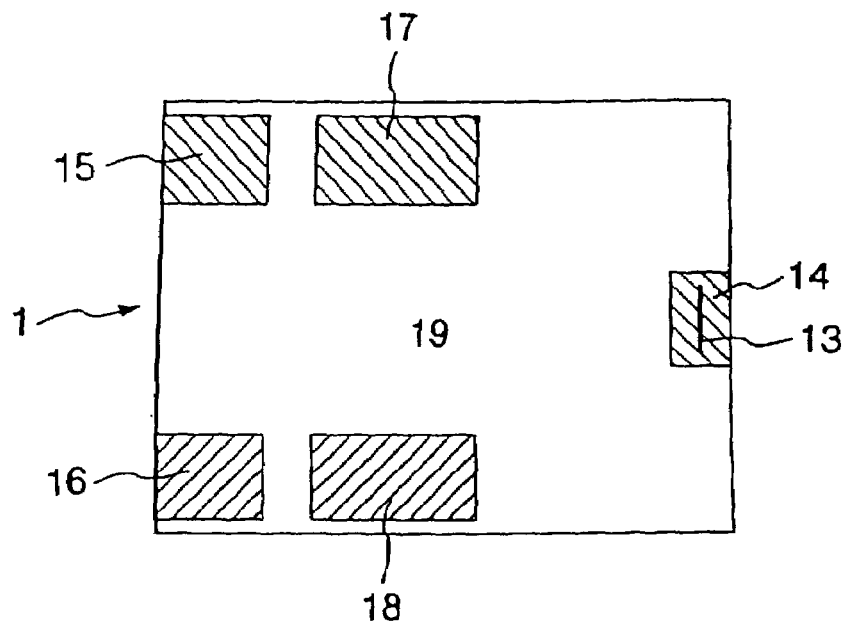
FIG. 3 is a top view showing the air bearing surface of the slider illustrated in FIG. 1.

FIG. 2 is an enlarged view of contact portions of the slider 1 and the magnetic disk 3. The main body of the slider 1 is made of ceramic such as $Al_2O_3TiC$. On the air bearing surface, a slider overcoat including a silicon layer 11 and a carbon layer 12 is formed. The silicon layer 11 and the carbon layer 12 are 3 nm and 7 nm in thickness, respectively. As shown in FIG. 3, a magnetic head 13 is disposed on a positive pressure center pad 14 located at the trailing edge of the slider 1. On the other hand, a carbon overcoat 31 is formed on the magnetic disk 3 as well. For the purpose of preventing adhesion of the slider 1 and the magnetic disk 3, the magnetic disk 3 has a texture on it. A texture 32 of the magnetic disk 3 is formed by etching the carbon overcoat. As for the shape thereof, it is formed more uniformly than the texture formed by widespread tape processing. As for the concrete texture shape, the top portion of the texture 32 takes the shape of nearly a circle having a diameter of approximately 1 μm. The height d1 of the texture 32 is approximately 15 nm, and the thickness d2 of the carbon overcoat 31 left after etching processing is approximately 10 nm. The distance between texture w1 is approximately 10 μm. Therefore, the ratio of the area of the textures 32 to the area of the whole magnetic disk is approximately 1%. Onto the carbon overcoat 31 of the magnetic disk, a lubricant is applied with a thickness of approximately 2 to 4 nm.

In the case where slider 1 conducts the contact recording onto this magnetic disk 3, the positive pressure center pad 14 of the slider 1, contacts the top portion of the texture 32 and the distance between one texture and other texture is about 10 μm which is very narrow as compared with the length of the slider 1. Therefore, the slider 1 cannot perfectly follow the shape of the texture and comes in contact with the top portion of the texture 32 as it slides. In the case where the slider 1 and the magnetic disk 3 maintain the contact state, the contact area of the slider 1 is overwhelmingly smaller than that of the magnetic disk 3 and the carbon layer 12 serving as the overcoat of the slider 1 wears earlier than the carbon overcoat 31 of the magnetic disk 3.

FIG. 3 shows an example of the air bearing surface of the slider 1 used in the first embodiment. The slider 1 has, a length of 1.2 mm and a width of 1.0 mm. The air bearing surface includes one pair of positive pressure side pads 15 and 16 located on the leading edge of the slider 1, one pair of positive pressure side pads 17 and 18 located on nearly the central portion of the slider 1 in the length direction, and a positive pressure center pad 14 having a magnetic head 13 and located on the trailing edge of the slider 1. A width of the positive pressure center pad 14 is wide enough to mount the magnetic head 13 thereon. The width is 200 μm, for example, in the present invention. The leading edge of this slider 1 has no tapered surfaces and all positive pressure pads have substantially smooth planar surfaces. The magnetic gap of the magnetic head 13 is formed at a distance of approximately 40 μm from the trailing edge of the slider 1. The magnetic gap is formed so as to prevent the magnetic head 13 from coming in direct contact with the magnetic disk 3 in reading/writing operation. Furthermore, the magnetic head 13 is a composite head having an MR head and a thin film head. The MR head utilizes a magneto resistive effect and serves as a read head. The thin film head serves as a write-head. A recess 19 for isolating respective positive pressure pads has a depth of at least 50 μm and is adapted so as, not to generate a negative pressure therein. The load w applied by the suspension 2 is 500 mgf. The load point A is set so as to coincide with the center of the slider 1.

Figure 4:
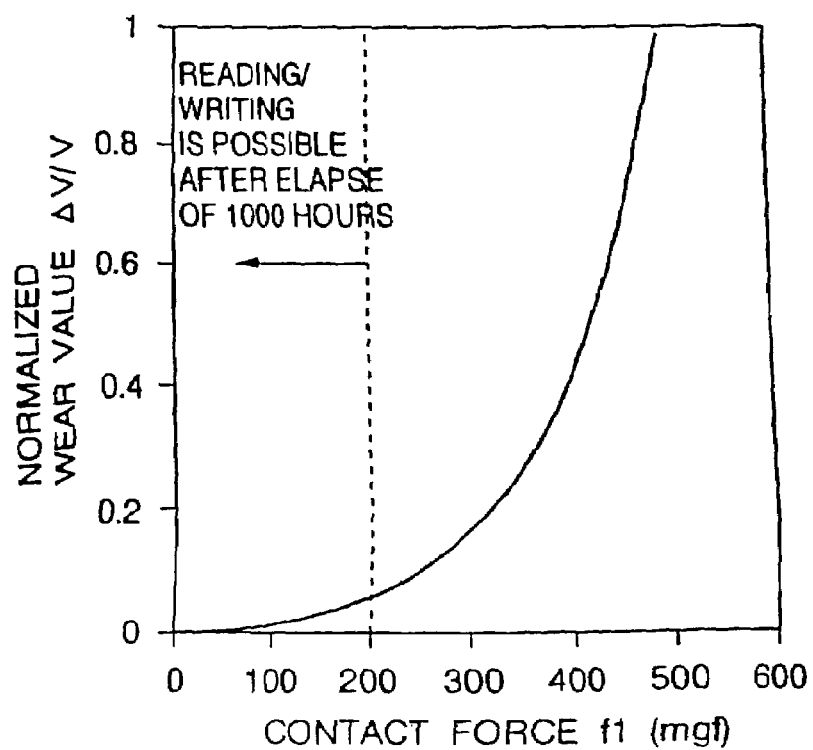
FIG. 4 is a graph showing the dependence of the normalized wear value upon the contact force applied between the slider and the magnetic disk.

An experiment of contact reading/writing was conducted by using the slider 1 and the magnetic disk 3 for 1,000 hours continuously. FIG. 4 shows dependence of the wear of the carbon layer 12 formed on the positive pressure center pad 14 of the slider 1 upon the contact force f1 in this case. The contact force f1 was measured by a piezo sensor which is mounted on the slider 1. The wear value was normalized by a wear value obtained after contact had been performed for 1,000 hours continuously under the state that the contact force f1 was kept at 500 mgf equivalent to the load w. In order to change the contact force f1, the flying height of the slider 1 was changed diversely on a magnetic disk 3 having a texture height d1 of 15 nm or the texture height d1 of the magnetic disk 3 was changed diversely under the condition that the flying height of the slider 1 was constant. In the case where the contact force f1 of the slider 1 and the magnetic disk 3 was 100 mgf or less, wear of the carbon overcoat 12 of the slider 1 was extremely small. If the contact force f1 became at least 100 mgf, the wear value of the carbon overcoat 12 located at the trailing edge of the slider 1 gradually increased. Until the contact force f1 reached approximately 200 mgf, however, it could be observed that the carbon overcoat 12 formed on the trailing edge of the slider 1 wore after continuous contact state over 1,000 hours, but the wear debris did not stick to the positive pressure pads 15 though 18 and the slider 1 could perform flying/contact stably with respect to the magnetic disk 3 to the end. Reading and writing could be performed with no problem at all. At this time, little wear could be observed on the top portion of the texture 32 of the carbon overcoat of the magnetic disk 3 which is in contact with the slider 1. This fact can be explained as follows. Immediately after the magnetic disk unit is started, the slider 1 is in contact with the magnetic disk 3 through a point or a line. As the wear of the carbon overcoat located on the trailing edge of the slider 1 advances, however, a newly generated surface of the carbon overcoat after wear becomes a new contact surface and consequently the contact pressure decreases. Until the contact force f1 reaches approximately 200 mgf, wear is considered not to advance if the area of contact is increased to some degree. Furthermore, until the contact force f1 between the slider 1 and the magnetic disk 3 reaches 200 mgf, the carbon overcoat is maintained in the magnetic gap portion of the magnetic head 13 even after continuous contact reading/writing operation lasting for 1,000 hours. The magnetic head 13 does not come in direct contact with the magnetic disk 3. The phenomenon that the output of the MR head is lowered due to heat generated by direct contact between the magnetic head 13 and the magnetic disk 3, i.e., the so-called thermal asperity is also prevented.

Figure 5:
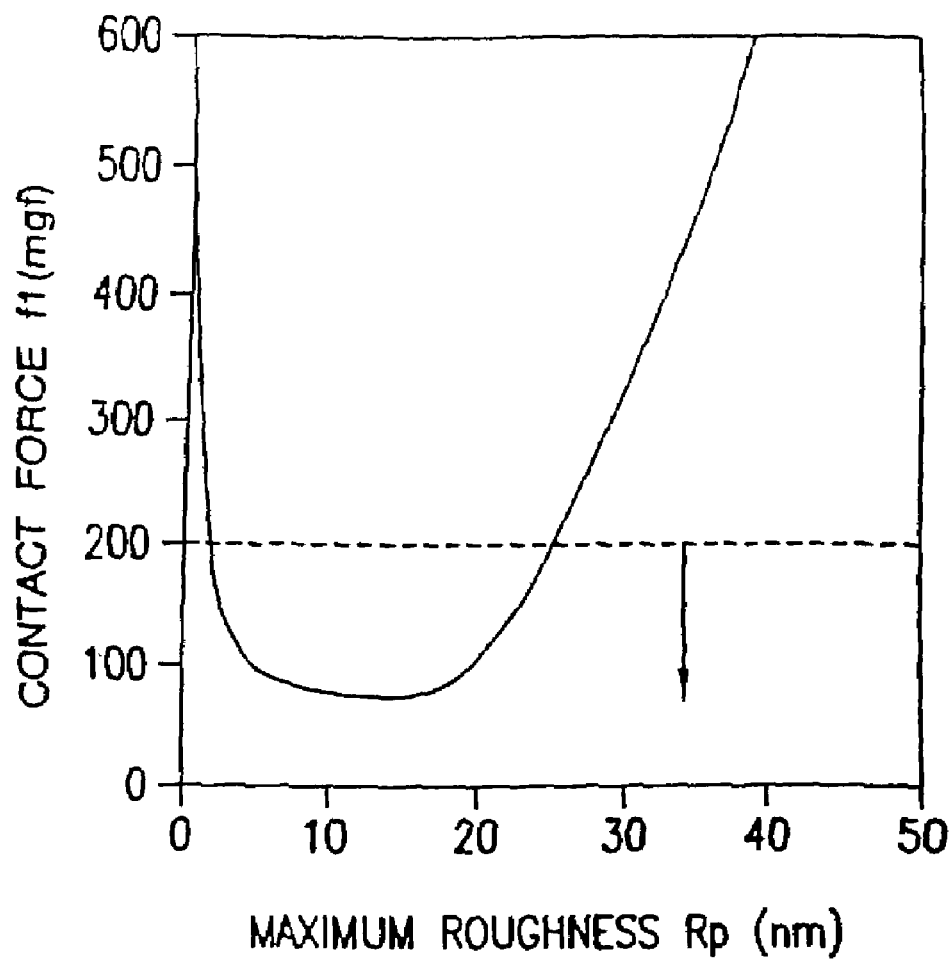
FIG. 5 is a graph showing dependence of the contact force between the slider and the magnetic disk upon the maximum roughness of the magnetic disk.

FIG. 5 shows dependence of the contact force f1 between the slider 1 and the magnetic disk 3 upon the maximum surface roughness of the magnetic disk 3. If the texture height d1 of the magnetic disk 3 is great and consequently the maximum surface roughness of the magnetic disk 3 is great or if debris formed by defective processing, for example, is present on the magnetic disk 3, then the contact force generated when the slider 1 comes in contact with that portion becomes extremely great and wear of the carbon overcoat of the slider 1 is caused from that contact portion, resulting in an accelerated damage. The texture height d1 of the magnetic disk 3 in the first embodiment is approximately 15 nm. Since the magnetic disk 3 itself has undulation, however, the maximum surface roughness is approximately 20 nm. For reducing the contact force f1 less than 200 mgf, the maximum surface roughness is desired to be 25 nm or less. This corresponds to the texture height d1 of approximately 20 nm. On the other hand, if the maximum surface roughness of the magnetic disk 3 is in the mirrorlike state, a large frictional force is generated in the contact portions of the slider 1 and the magnetic disk 3 and the contact force f1 abruptly becomes large. Preferably, therefore, the maximum surface roughness is desired to be at least 2 nm.

Furthermore, it is not necessary to form the carbon overcoat of the slider 1 on all of the positive pressure side pads 15 through 18 of the air bearing surface of the slider 1, but the carbon overcoat may be formed on the positive pressure center pad 14 of the trailing edge which is in contact with the magnetic disk 3.

Figure 6:
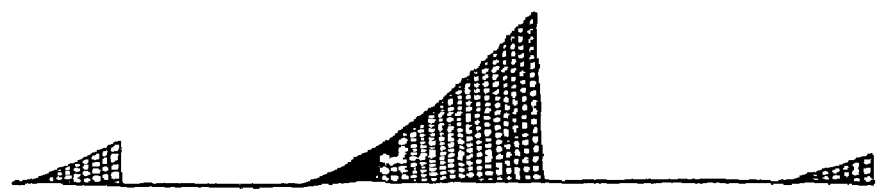
FIG. 6 is a graph showing the pressure distribution of the slider.

FIG. 6 is a graph showing the pressure distribution of the slider 1. When seen from the length direction of the slider 1, the positive pressure pads 17 and 18 opposite to the load point A are the largest as compared with the positive pressure pads 15 and 16 and the positive pressure center pad 14 as shown in FIG., 1. In addition, the slider 1 has no tapered surfaces on the leading edge. Even in the case where the trailing edge of the slider 1 keeps in contact with the magnetic disk 3 as in the present invention, therefore, the pressure center C resulting from the air flow is formed near the load point A. The distance L2 between the load point A and the pressure center C is thus shortened, and the contact force f1 can be reduced. In the present embodiment, the distance L1 between the load point A and the contact portion B was 0.5 mm and the distance L2 between the load point A and the pressure center C was 0.1 mm. Furthermore, since the slider 1 has such pressure distribution that the pressure becomes the maximum under the load point, the stiffness of the air bearing in the pitch rotational direction is small. This is also effective in reducing the contact force f1.

Figure 7:
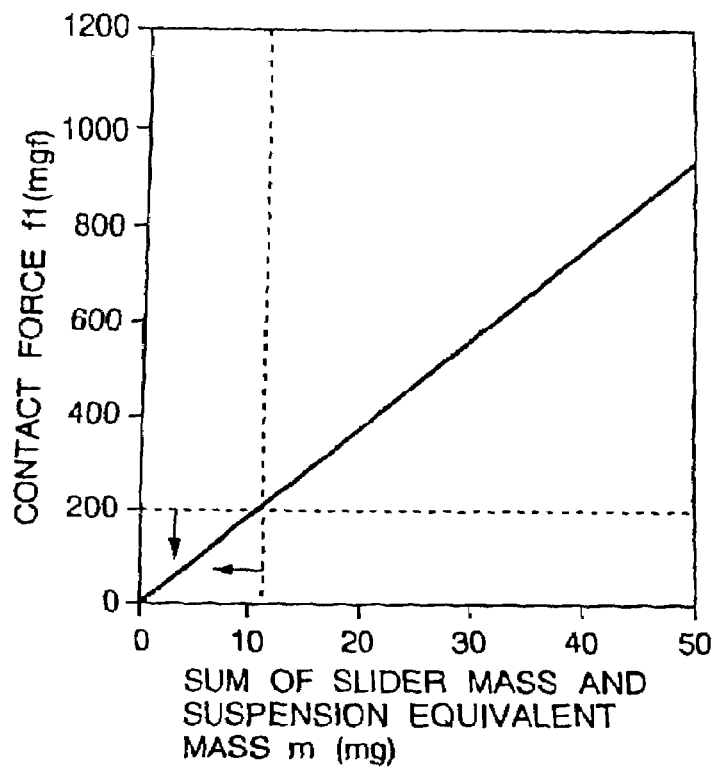
FIG. 7 is a graph showing dependence of the contact force between the slider and the magnetic disk upon the sum of the mass of the slider and the equivalent mass of a suspension.

FIG. 7 shows dependence of the contact force f1 upon the sum of the slider mass and suspension equivalent mass when the magnetic disk 3 having a texture height d1 of 15 nm and a maximum surface roughness of 20 nm as described with reference to the first embodiment is used. Herein, the equivalent mass of the suspension 2 is a mass with which the suspension 2 acts as effective inertia with respect to the movement of the slider 1 conducted in a direction perpendicular to the magnetic disk surface, and it is equivalent to a mass obtained when the suspension 2 is approximated by a spring-mass model of a concentrated mass system. For making the contact force f1 equal to 200 mgf or less, it is necessary to make the sum of the slider mass and the suspension equivalent mass equal to 11 mg or less. In the first embodiment, the sum of equivalent masses of the combination of the slider 1 and the suspension 2 was approximately 3 mg. For reducing the slider mass, it is necessary to reduce the size of the slider. The size of the slider 1 is desired to be at most approximately 2.0 mm in length and approximately 1.0 mm in width. If the sum of the slider mass and the suspension equivalent mass is too small, however, the load also becomes small accordingly and consequently handling becomes difficult in such a system that the slider 1 and the suspension 2 are separately formed as in the present invention. For facilitating handling, therefore, the sum of the slider mass and the suspension equivalent mass is preferably set equal to at least 2 mg.

As heretofore described, to reduce the contact force f1 reducing the size of the slider 1 and increasing the distance L1 between the load point A and the contact portion B are effective. However, they are mutually contradictory design parameters. Therefore, it is also important to reduce the load w to such a degree that the variance does not increase. Since the positive pressure pads of the slider 1 in the first embodiment has a substantially smooth surface and has no tapered surfaces formed thereon, the load w can be minimized among the sliders 1 having the same size. For making the contact force f1 equal to 200 mgf or less when the slider 1 in the first embodiment is used and reducing the variance of the load w of the suspension 2, it is desired to set the load w equal to a value in the range of approximately 0.4 gf to 1.5 gf.

Figure 8:
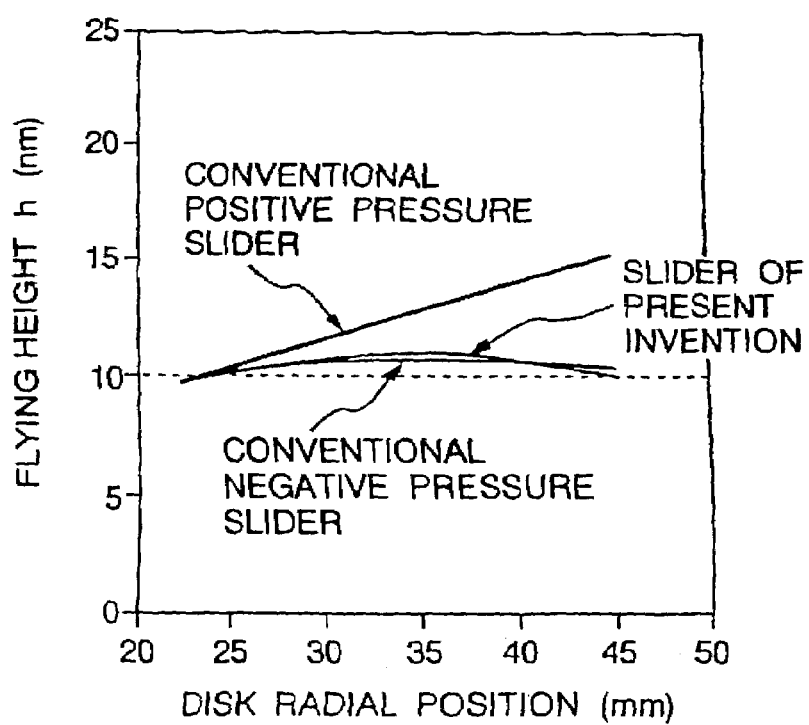
FIG. 8 is a graph showing dependence of the flying height upon the radial disk position in a slider of the present invention and conventional sliders.
Figure 9:
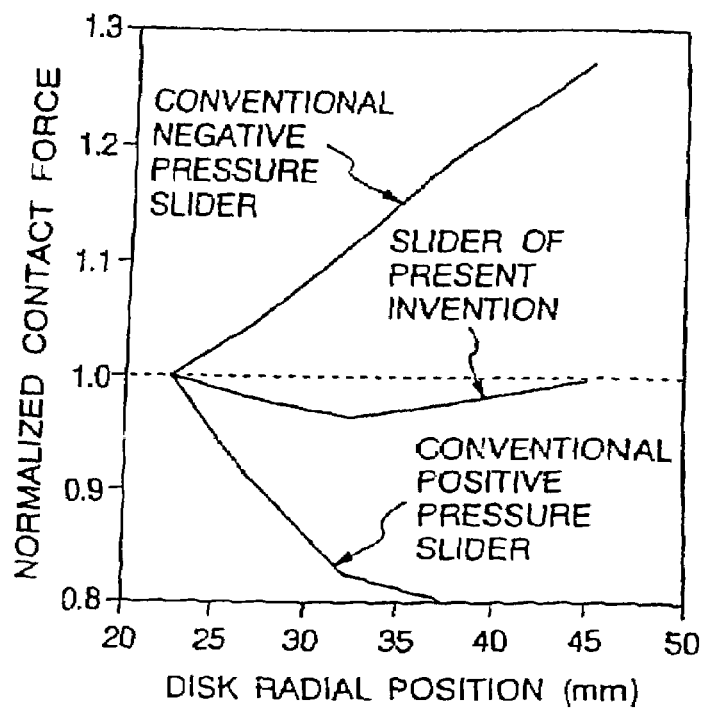
FIG. 9 is a graph showing dependence of the normalized contact force upon the radial disk position in a slider of the present invention and conventional sliders.

FIG. 8 shows the flying height profile, in the radial direction, of a magnetic disk having a diameter of 3.5 inch in the case where the slider 1 of the first embodiment, the conventional positive pressure slider and the conventional negative pressure slider are designed as flying type sliders. FIG. 9 shows the profile of the contact force. The contact force is represented as a value obtained by normalizing the contact force in each radial position by the contact force of each slider in an inner radius of the magnetic disk 3. The slider of conventional mixed flying/contact type has the following problem. When the position is located at an outer radius, i.e., as the peripheral velocity is increased, the flying force increases and the stable contact state cannot be maintained. In the slider according to the present invention, however, the flying height can be made nearly constant over the entire surface of the magnetic disk as shown in FIG. 8. Therefore, the contact force can also be kept constant over the entire disk surface while keeping the contact force at a sufficient small value with respect to the wear of the carbon overcoat of the slider 1. The fact that the contact force is kept at a nearly constant value over the entire disk surface means that stable contact reading/writing operation can be conducted over the entire disk surface. In the case of the conventional positive pressure slider, however, the velocity becomes greater and consequently the flying height is increased when the position is located at an outer radius. As a result, the stable contact state cannot be maintained in the case where the conventional positive pressure slider is used as the slider of a mixed flying/contact type.

Furthermore, in the case where the conventional negative pressure slider is used as the slider of a mixed flying/contact type, the negative pressure increases as the position moves to an outer radius. Therefore, the flying height profile can be made nearly constant in the same way as the slider according to the present invention. Since the negative pressure becomes equivalent to the load w with respect to the magnetic disk, however, the contact force f1 becomes greater as the position moves to an outer radius. Thus the risk of occurrence of a fatal damage between the slider and the magnetic disk becomes greater.

Figure 10A:
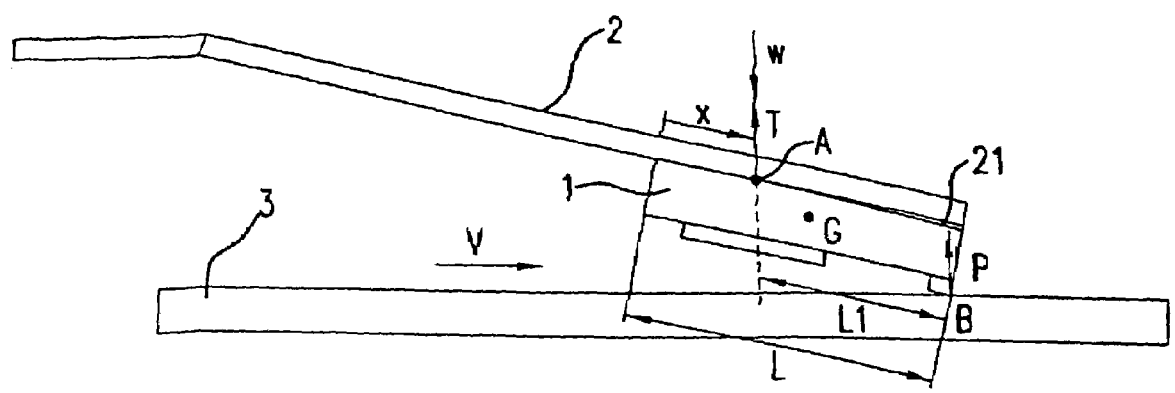
FIG. 10A is a side view showing the contact state between a slider and a magnetic disk in another embodiment of the present invention.
Figure 10B:
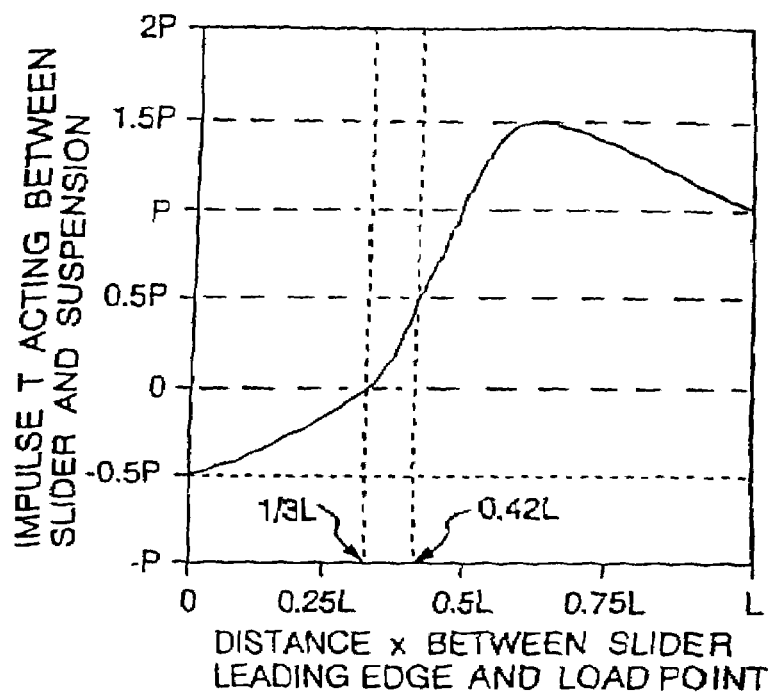
FIG. 10B is a graph showing dependence of impulsive force T applied between the slider and a suspension illustrated in FIG. 10A upon a distance x between a leading edge of the slider and a load point.

Further features of a second embodiment will now be described by referring to FIGS. 10A and 10B. In the magnetic disk unit of the contact recording type as in the present invention, not only does a static contact force f1 steadily act on the contact portion B between the slider 1 and the magnetic disk 3 as described before with reference to the first embodiment, but a dynamic impulsive force P which is high-frequency disturbance on the slider 1 from the magnetic disk 3 via the contact portion B is also present. By this impulsive force P, impulsive force T acts on the suspension 2 from the slider 1 via the load point A. As a reaction thereof, the slider 1 receives the impulsive force T from the suspension 2. By the impulsive force T acting from the suspension 2 on the slider 1 via the load point A, unsteady contact force in the contact portion B between the slider 1 and the magnetic disk 3 increases. Or the slider 1 which has been in contact with the magnetic disk 3 is temporarily separated from the magnetic disk and thereafter hits the magnetic disk 3 again. This is called a jumping phenomenon. This results in a problem that the magnetic disk 3 is damaged fatally and reading/writing operation becomes impossible.

In reducing such trouble caused by a dynamic impulsive force, it is effective to dispose the load point A on a point which lies between the leading edge of the slider 1 and the center of the slider length direction as in the present embodiment. This effect will now be described in detail by referring to FIG. 10B. FIG. 10B shows dependence of the impulsive force T acting between the slider 1 and the suspension 2 via the load point A when the impulsive force P has acted on the contact portion B of the trailing edge of the slider 1, upon the distance x between the leading edge of the slider 1 and the load point A. When x=L, the load point A and the contact point B between the slider 1 and the magnetic disk 3 are on the same axis of the slider thickness direction, and the impulsive force P acting between the slider 1 and the magnetic disk 3 becomes equal to the impulsive force T acting between the slider 1 and the suspension 2. When x=0.5L, i.e., when the load point A is located on the center of the slider length direction and the load point A and the center of gravity of slider G are on the same axis of the slider thickness direction, the impulsive force P becomes equal to the impulsive force T. On the other hand, when 0.5L<x<L, i.e., when the load point A is located on the trailing edge of the slider 1 with respect to the center of the slider length direction, the impulsive force T which is greater than the impulsive force P acts between the slider 1 and the suspension 2. This increases the possibility that the slider 1 will hit the magnetic disk 3 with an impulsive force greater than the impulsive force P which has acted initially at the contact point B and the magnetic disk 3 will be damaged fatally. On the contrary, when 0.5L>x, i.e., when the load point A is located on the leading edge side of the slider 1 with respect to the center of the slider length direction, the impulsive force T acting between the slider 1 and the suspension 2 becomes smaller than the impulsive force acting between the slider 1 and the magnetic disk 3 and consequently the possibility of damaging the magnetic disk fatally is also decreased. Preferably, by letting 0.42L>x, the magnitude of the impulsive force T acting between the slider 1 and the suspension 2 can be made equal to half or less of the magnitude of the impulsive force P acting between the slider 1 and the magnetic disk 3. In particular, when x=(⅓)L, the relation T=0 is satisfied and an impulsive force P which has acted between the slider 1 and the magnetic disk 3 on the contact portion B is not transmitted to the suspension 2 via the load action point A, thus there being no impulsive force from the suspension on the slider 1. On the contrary, even if any disturbance acts on the suspension 2, it is not transmitted to the contact portion B between the slider 1 and the magnetic disk 3 via the load point A. By thus making the contact portion B and the load point A mutual centers of impact with the center of gravity of slider G between, mechanical interaction in the vertical movement direction is not present between the contact portion B and the suspension 2 and mutual isolation of disturbance can be performed. In addition, by displacing the load point A to the leading edge side of slider 1 with respect to the slider length direction, the distance L1 between the load point A and the contact portion B becomes great as evident from equation (3) and the steady contact force fl can also be reduced simultaneously.

In reducing the jumping of the slider 1 from the magnetic disk 3 caused by contact between the slider 1 and the magnetic disk 3 and reducing increase of unsteady contact force caused thereby, it is effective to not only adopt the above described mechanical disturbance isolating method but also to apply high polymer material such as polyimide onto the suspension 2 as a vibration isolating material. Mounting a vibration isolating material on the suspension 2 has been performed in the case of the flying type as well. In a system such as the contact recording type in which high-frequency distribution is expected, however, the above described vibration isolating material of the suspension functions further effectively.

Figure 12:
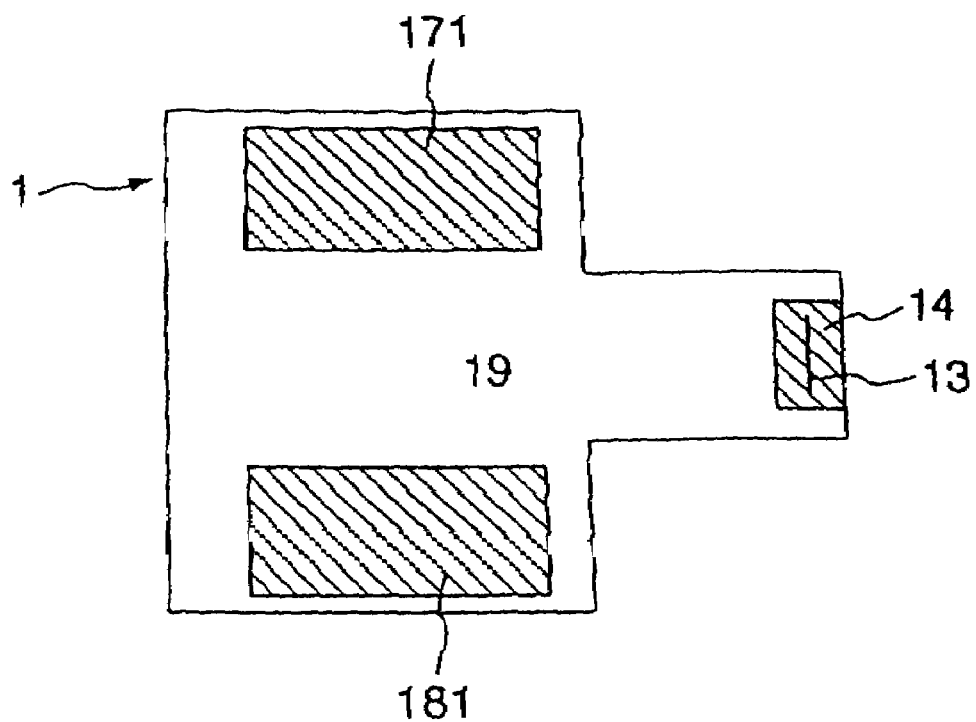
FIG. 12 is a top view showing another example of an air bearing surface of a slider.

Furthermore, as another method for reducing the unsteady contact force, it is effective to reduce the mass of the slider. For example, one method is to cut the recess portion located around the positive pressure center pad 14 as shown in FIG. 12 to reduce the mass of the slider 1.

Figure 10C:
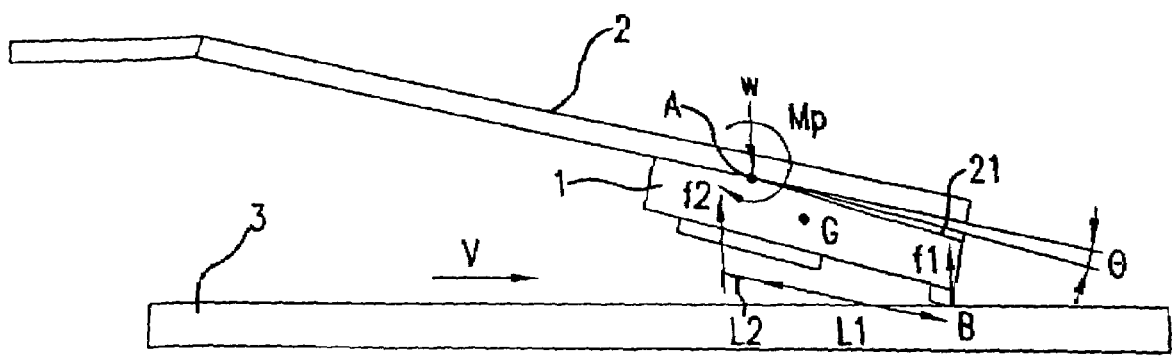
FIG. 10C is a side view showing the contact state between a slider and a magnetic disk in another embodiment of the present invention.
Figure 11:
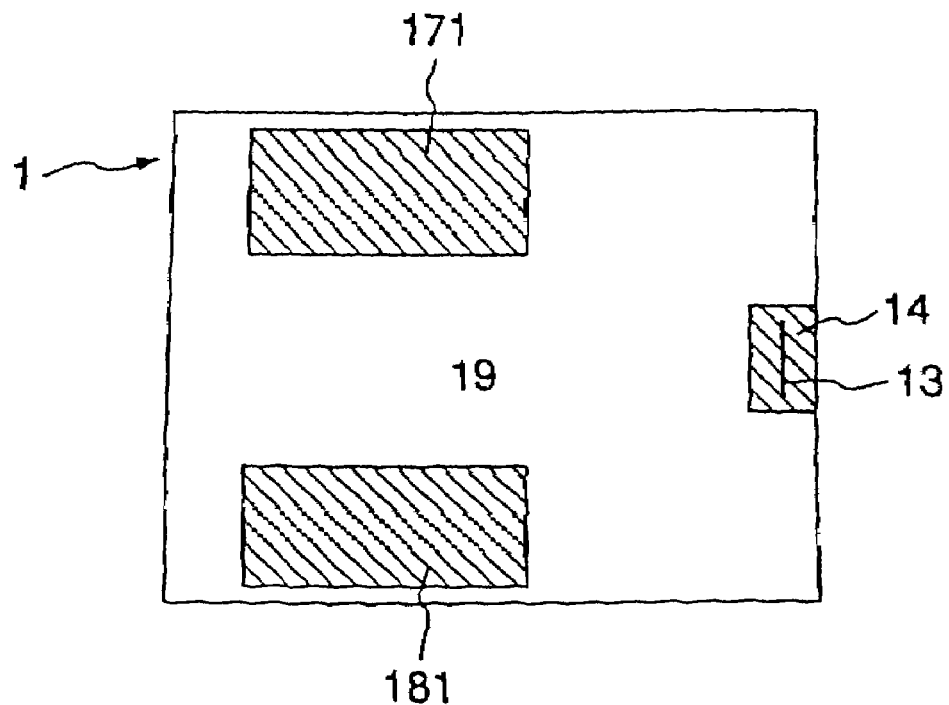
FIG. 11 is a top view showing an example of an air bearing surface of a slider.

FIG. 10C is a side view illustrating the contact state between the slider 1 and the magnetic disk 3 in a magnetic disk unit of the contact recording type according to the second embodiment of the present invention. FIG. 11 shows an example of the air bearing surface of the slider 1 in the second embodiment. The slider 1 has a length of 1.2 mm and a width of 1.0 mm. The air bearing surface of slider 1 includes one pair of positive pressure pads 171 and 181 formed in positions opposite to the load point A, and a positive pressure center pad 14 having a magnetic head 13 and located on the trailing edge. The depth of the recess 19 is at least 50 μm and a negative pressure is not generated. The load w given by the suspension 2 via the load point A is 500 mgf. This load w is nearly equal in magnitude to flying force f2 generated by the positive pressure pads 171 and 181. Furthermore, the pressure center C of the flying force f2 is made nearly the same as the load action point A. In addition, flying force generated by the positive pressure center pad 14 of the slider 1 is negligibly small as compared with the flying force f2. In the present embodiment, the load point A is located on the leading edge side with respect to the center of the slider. Therefore, the distance L1 between the load point A and the positive pressure center pad 14 is sufficiently bigger than the distance between the load point A and the pressure center G of the flying force f2 generated by the positive pressure pads 171 and 181. Furthermore, the greatest feature of the present embodiment is that moment Mp in such a direction as to thrust the positive pressure center pad 14 against the magnetic disk 3 acts on the slider 1 by not only applying the load w upon the load point A but also turning a gimbal 21 of the suspension 2 by an angle θ in such a direction as to make the positive pressure center pad 14 approach the magnetic disk 3. In other words, a gimbal having much smaller stiffness than that of the load-beam portion of the suspension 2 is used to add the load f1 to the positive pressure center pad 14. A very small contact load has thus been realized by using a simple configuration.

Equilibrium of force exerted between the slider/suspension and the magnetic disk in the second embodiment can be expressed by the following equations.

$$w \approx f2 \tag{4}$$

$$f1 = \frac{Mp}{L1} \tag{5}$$

In the second embodiment, stiffness kp of the gimbal 21 in the pitch direction was set equal to 0.087 gf·mm/degree, and the distance L1 between the load point A and the contact portion B of the positive pressure center pad 14 was set equal to 0.8 mm. In this slider/suspension, the contact force f1 can be set equal to 200 mgf, for example, by tilting the pitch angle θ by 1.830° beforehand in such a direction as to make the positive pressure center pad 14 approach the magnetic disk 3. Processing of such a degree can be easily implemented.

Figure 13:
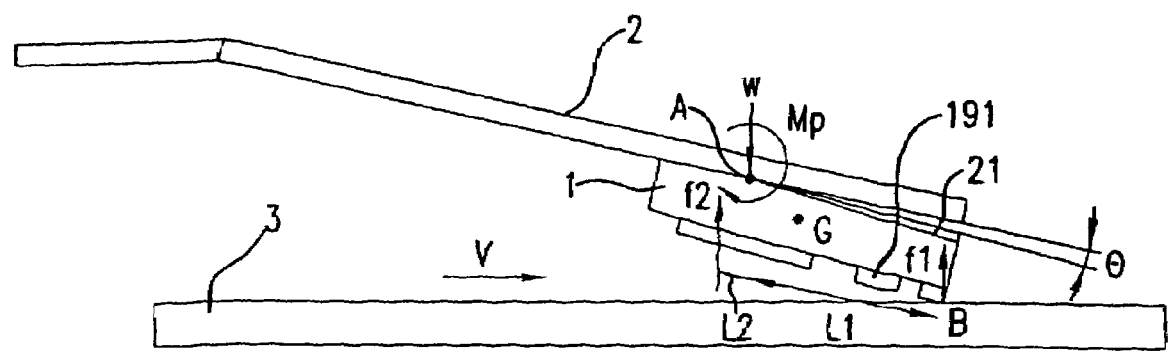
FIG. 13 is a side view showing the contact state between a slider and a magnetic disk in another embodiment of the present invention.
Figure 14:
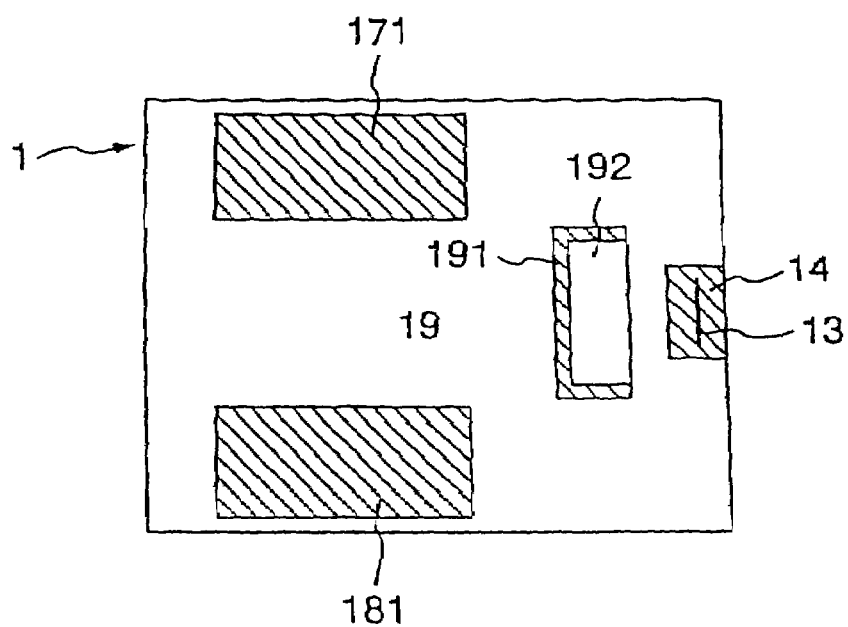
FIG. 14 is a top view showing an air bearing surface of a slider.

FIG. 13 is a side view illustrating the contact state between the slider/suspension and the magnetic disk in a magnetic disk unit of contact recording type according to a third embodiment of the present invention. FIG. 14 shows an example of the slider in the third embodiment. In the slider/suspension of the third embodiment, the slider flies in such state that the load w balances with the flying force f2 generated by the positive pressure pads 171 and 181 in the same way as the slider/suspension of the second embodiment. The positive pressure center pad 14 is subjected to a force equivalent to load f1 caused by the moment of the gimbal 21 and it is in contact with the magnetic disk. In the third embodiment, a positive pressure rail 191 for generating negative pressure on the leading edge side of the positive pressure center pad 14 and a negative pressure recess 192 in which negative pressure is generated are formed as shown in FIG. 14 unlike the second embodiment. The recess 19 has a depth of at least 50 μm in the same way as the first and second embodiments and generates only positive pressure. The negative pressure recess 192 has a depth of approximately 6 μm. In the present embodiment, design is performed so that the flying force in this positive pressure rail 191 will be equal in magnitude to the negative pressure generated in the negative pressure recess 192. Therefore, the flying force generated by this positive pressure rail 191 and the negative pressure generated by the negative pressure recess 192 do not affect the magnitude of the flying force and contact force of the entire slider. However, if the positive pressure rail 191 and the negative pressure recess 192 are disposed on the air bearing surface of the slider 1 and air is effectively disposed between the slider and the magnetic disk, dumping of air is increased. Especially in the magnetic disk unit of contact recording type as in the present invention, this air dumping effectively restricts vibration of the slider/suspension.

Figure 15:
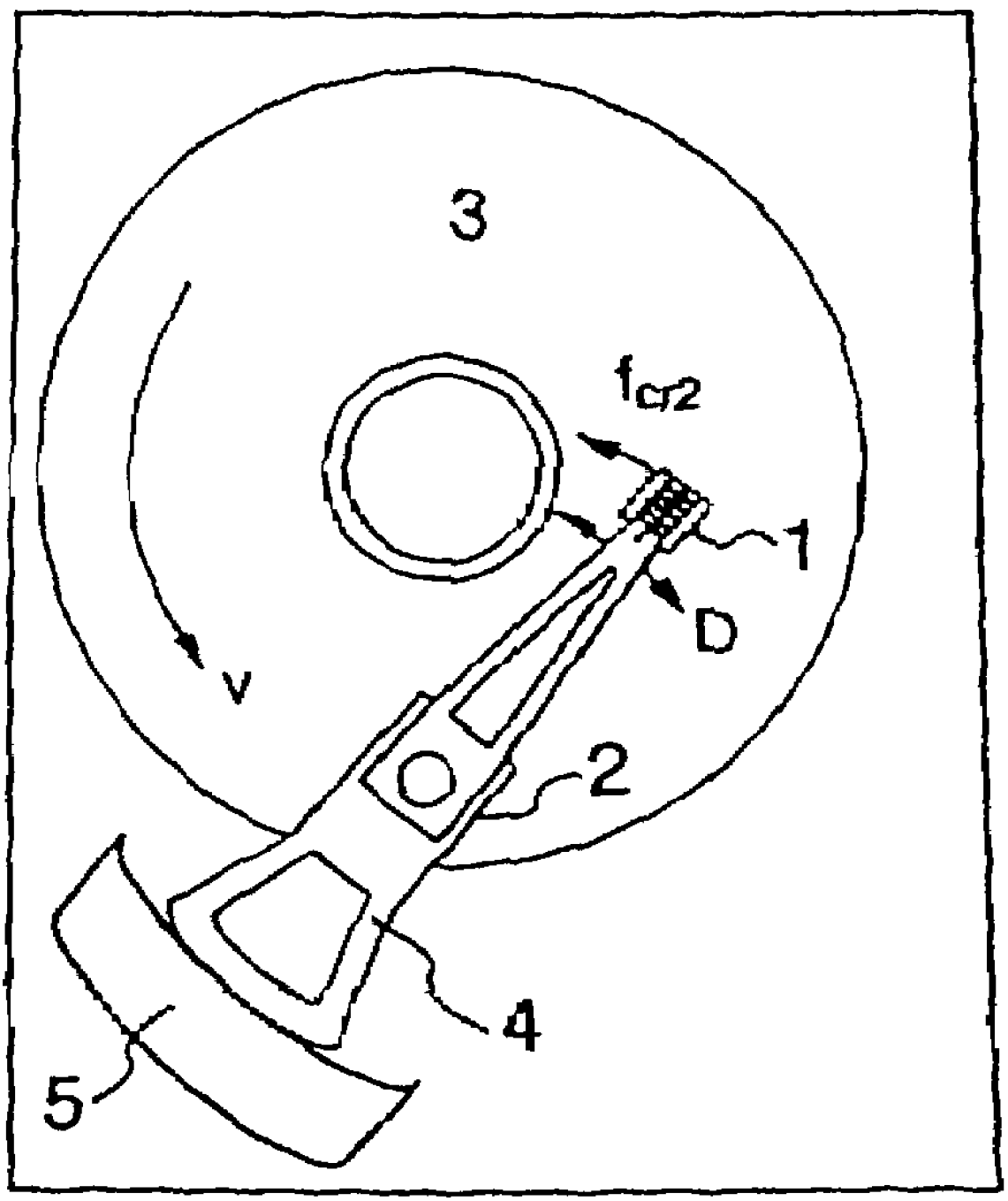
FIG. 15 is a top view showing a magnetic disk unit with a rotary actuator scheme using a slider of the present invention.

FIG. 15 is a top view of a magnetic disk unit with rotary actuator scheme to which the above described configuration according to the present invention is applied. The slider 1 according to the present invention is subjected to seeking and positioning on whole data track of the magnetic disk 3 by a rotary actuator arm 4 via a suspension 2. The rotary actuator arm 4 is driven by a voice coil motor 5 in a direction represented by arrow D. With respect to magnetic head positioning, the most noticeable difference between the magnetic disk unit of the contact recording type according to the present invention and the conventional slider/suspension of flying type is that frictional force $f_{cr2}$ acts between contact points of the slider and the magnetic disk in a direction opposite to the positioning movement direction at the time of seeking and positioning. This frictional force $f_{cr2}$ exerts great influence upon the positioning precision of the magnetic head. If the frictional force becomes great, then the magnetic-head gets out of the data track in which the magnetic head should be positioned and reading/writing cannot be conducted. In the worst case, the actuator might run away and the slider/suspension or the magnetic disk might be destroyed. This frictional force $f_{cr2}$ in the seeking and positioning direction is defined by lateral stiffness $k_2$ of the suspension in the seeking and positioning direction and data track width $T_r$ as represented by the following expression.

$$f_{cr2} \leq k_2 \cdot T_r \qquad (6)$$

Assuming that the track density is 20,000 TPI tracks/inch), the track width $T_r$ is 1.27 μm. The lateral stiffness $k_2$ of the suspension according to the present invention in the seeking and positioning direction is approximately 0.24 kgf/mm, and the frictional force $f_{cr2}$ in the seeking and positioning direction becomes approximately 300 mgf. For preventing the magnetic head from getting out of the data track in which the magnetic head should be positioned, therefore, it is at least necessary to make the frictional force $f_{cr2}$ less than 300 mgf. If it is desired to increase the track density, it is necessary to increase the lateral stiffness $k_2$ of the suspension 2 or reduce the frictional force $f_{cr2}$ itself. Denoting the coefficient of friction between the slider 1 and the magnetic disk 3 by μ, load by w, and adsorption between the slider 1 and the magnetic disk 3 by $w_s$, the frictional force $f_{cr2}$ can be represented by the following expression as well.

$$f_{cr2} \leq \mu(w+w_s) \qquad (7)$$

According to experiments conducted by the present inventors, the coefficient of friction between the slider 1 of the present invention and the magnetic disk having the texture height d1 described with reference to the first embodiment was approximately 0.3. The load w of the suspension 2 is 500 mgf. For setting $f_{cr2}$ equal to 300 mgf or less as described above, therefore, the adsorption $w_s$ must be 500 mgf or less from expression (7). At the time of seeking and positioning, the positive pressure center pad 14 is in contact with the magnetic disk 3 and the area of that contact is approximately 0.02 mm2. Therefore, adsorption allowed per unit area of the contact portion B is 25 gf/mm². This is nearly equal to adsorption acting between the slider 1 and the magnetic disk 3 per unit area in the case where the magnetic disk described with reference to the first embodiment having a texture height d1 of 15 nm and a texture area ratio of 1% is used. Therefore, it is appreciated that the magnetic disk having the configuration described with reference to the first embodiment is effective in reducing the frictional force $f_{cr2}$ in the seeking direction as well.

Furthermore, when a slider/suspension of the contact recording type as in the present invention is recording on the same radius of a magnetic disk, or during seeking and positioning operation, frictional force $f_{cr3}$ acts in the bit direction (circumference direction) of the magnetic disk. Unless this frictional force $f_{cr3}$ in the bit direction also satisfies a condition similar to that of the frictional force $f_{cr2}$ in the track direction (radius direction), precise positioning cannot be conducted. Denoting lateral stiffness in the bit direction, which is octagonal D to the seeking direction, of the suspension by $k_3$ and bit width by $T_b$, the following expression must thus be satisfied.

$$f_{cr3} \leq k_3 \cdot T_b \qquad (8)$$

Assuming now that the bit density is 500,000 BPI (bits/inch), the bit width becomes 0.05 μm. If the frictional force $f_{cr3}$ in the bit direction is desired to be nearly equal to frictional force $f_{cr2}$ in the seeking direction, the stiffness $k_3$ in the bit direction must be set equal to approximately 6 kgf/mm.

In the slider/suspension of the flying type, texture processing is conducted on the magnetic disk in order to reduce the frictional force at the time of starting. In the magnetic disk unit of contact recording type, however, the texture of the magnetic disk is important to reduce the frictional force not only at the time of starting but also at the time of seeking.

In the above described embodiment, texture processing is conducted on the magnetic disk side. Even if texture processing is conducted in the slider 1 side, however, a similar effect can be obtained. At this time, the magnetic disk 3 need not undergo texture processing, and the magnetic recording gap can be advantageously reduced by a value corresponding to the texture height d1.

As heretofore described, the contact force between the slider 1 and the magnetic disk 3 can be made 200 mgf or less in the slider of mixed flying/contact type according to the present invention. In addition, contact reading/writing operation can be conducted stably over the entire surface for a long time without depending upon the velocity. Furthermore, disturbances acting on the slider 1 or the suspension 2 can be isolated each other. It is also possible to prevent jumping of the slider 1 from the magnetic disk 3 and increasing of unsteady contact force. Furthermore, the contact force at the time of seeking and positioning can be reduced, and accurate positioning can be conducted even in contact recording.

What is claimed is:

1. A magnetic disk unit comprising:
   a magnetic disk rotatably attached to a spindle;
   a slider having a magnetic head for reading/writing data onto/from said magnetic disk;
   a first pad disposed at the center of a trailing edge of said slider, and having the magnetic head disposed thereon;
   second pads disposed on a leading edge of said slider, and having no magnetic head; and
   a suspension providing said slider with a predetermined load at a load point; wherein said load point is located at substantially one third of a total length of said slider, from the leading edge of said slider, wherein said one third of a total length of said slider is subsequently matched with a center of impact which occurs as a result of the contact between said first pad and said magnetic disk;
   wherein the slider is subjected to a pitch moment by a gimbal coupled to the suspension, whereby said pitch moment acts on the slider by applying a predetermined load upon the load point and also turns said gimbal by a predetermined angle in a direction as to move said first pad towards said magnetic disk.

* * * * *

UNITED STATES PATENT AND TRADEMARK OFFICE
CERTIFICATE OF CORRECTION

PATENT NO. : 7,061,722 B2
APPLICATION NO. : 10/245330
DATED : June 13, 2006
INVENTOR(S) : Hidekazu Kohira et al.

It is certified that error appears in the above-identified patent and that said Letters Patent is hereby corrected as shown below:

| Column | Line | |
|---|---|---|
| 2 | 16 | After "slider" delete ".". |
| 2 | 58 | After "embodiment" delete "~". |
| 4 | 57 | After "slider 1" delete ",". |
| 5 | 2 | After "slider 1 has" delete ",". |
| 5 | 25 | After "so as" delete ",". |
| 5 | 37 | Change "force fl" to --force f1--. |
| 5 | 38 | Change "force fl" to --force f1--. |
| 5 | 40 | Change "dl" to --d1-- (two occurrences). |
| 5 | 43 | Change "force fl" to --force f1--. |
| 5 | 45 | Change "force fl" to --force f1--. |
| 6 | 1 | Change "force fl" to --force f1--. |
| 6 | 14 | Change "height dl" to --height dl--. |
| 6 | 21 | Change "height dl" to --height d1--. |
| 6 | 45 | Change "FIG., 1" to --FIG. 1--. |
| 6 | 62 | Change "height dl" to --height d1--. |
| 9 | 20 | Change "force fl" to --force f1--. |
| 10 | 26 | Change "fl" to --f1--. |
| 11 | 26 | Change "tracks/" to --(tracks/--. |
| 11 | 47 | Change "height dl" to --height d1--. |

UNITED STATES PATENT AND TRADEMARK OFFICE
CERTIFICATE OF CORRECTION

PATENT NO. : 7,061,722 B2
APPLICATION NO. : 10/245330
DATED : June 13, 2006
INVENTOR(S) : Hidekazu Kohira et al.

It is certified that error appears in the above-identified patent and that said Letters Patent is hereby corrected as shown below:

| Column | Line | |
|--------|------|---|
| 12 | 37 | After "isolated" insert --from--. |

Signed and Sealed this

Seventeenth Day of April, 2007

JON W. DUDAS
*Director of the United States Patent and Trademark Office*